United States Patent Office 3,503,705
Patented Mar. 31, 1970

3,503,705
PROCESSING OF OIL SHALE
James E. Tackett, Jr., Littleton, Colo., assignor to Marathon Oil Company, Findlay, Ohio, a corporation of Ohio
No Drawing. Filed Mar. 4, 1968, Ser. No. 709,909
Int. Cl. C01d 11/00; C01x 7/00, 7/04
U.S. Cl. 23—50                                    6 Claims

ABSTRACT OF THE DISCLOSURE

Aluminous compounds are extracted from oil shale by contacting the oil shale with an acidic aqueous solution containing a surfactant sufficient to reduce the interfacial tension between kerogen (surrounding dawsonite in the oil shale) and the solution thus permitting the solution to contact and solubilize the dawsonite, and then treating the liquid phase to extract the aluminous compounds therefrom.

BACKGROUND OF THE INVENTION

The prior art teaches that aluminum is obtained by preparing $Al_2O_3$ and then reducing $Al_2O_3$ to metallic aluminum. The alumina is generally obtained from bauxite because the latter contains a high concentration of aluminum and is generally free from harmful impurities. Bauxite is practically the only source of aluminum metal under present processing technology. However, bauxite containing appreciable amounts of iron, silica, and titania are not suitable for conventional alumina extraction. The known useful bauxite deposits in the United States are very limited.

Much research effort has been carried out in an endeavor to produce aluminum from different aluminous materials, but few recent innovations have been made.

Applicant has discovered a novel process of extracting aluminous compounds from dawsonite in oil shale. This process comprises contacting the oil shale with an aqueous solution having a pH below about 3, and more preferably below about 1.5, and containing a surfactant sufficient to permit wetting of the shale by the liquid, separating the liquid phase from the shale and treating the liquid phase to obtain the aluminous compounds therefrom.

DESCRIPTION OF THE INVENTION

Kerogen forms a protective covering around the dawsonite in oil shale. Such covering impedes the contacting of the dawsonite with a "leachable" liquid. Applicant has discovered that by incorporating a surface-active agent into the leaching solution, this adverse phenomenon can be corrected.

Applicant's process includes contacting the oil shale with an aqueous solution containing a surface-active agent and an acid agent. The surface-active agent should be present in amounts sufficient to permit wetting of the kerogen and contacting of the dawsonite with the acid agent. The acid agent should be present in sufficient amounts to leach or solubilize the dawsonite or aluminous compound. That is, the agent should be capable of reacting with dawsonite according to the following equation:

$$NaAl(OH)_2CO_3 + 4H^+ \rightarrow Na^+ + Al^{+3} + 3H_2O + CO_2\uparrow$$

Examples of useful acid agents include those having dissociation constants greater than about $1 \times 10^{-4}$. Such acid agents include hydrochloric, hydrofluoric, hydroiodic, nitric, sulfuric, sulfurous, phosphoric and trifluoracetic acids. Volatile acids are advantageous because they can be easily recovered and recycled as "make-up" acid in the process.

The surface-active agent in the aqueous liquid should be in amounts sufficient to permit wetting of the oil shale with said liquid. Examples of surface-active agents include the various nonionic, cationic, and anionic surfactants. Examples of such agents include octylphenoxy polyethoxy ethanol, glycerol trioleate, polyethylene glycol laurate, N,N'-dimethylcapioamide, lauric dimethylamine oxide, lauric diethanol amine, sodium dioctylsulfosuccinate, glyceryl trioleate sulfate, ammonium dibutylnaphthalene sulfonate, sodium dodecyldiphenylether disulfonate, sodium N-methyl-N-oleyltaurate, sodium lauryl sulfate, sodium lauryl ether sulfate, lauryl pyridinium chloride, cetyl dimethyl benzyl ammonium chloride, and N-stearyl betaine. Also, the petroleum sulfonates are alkyl aryl naphthenic sulfonates useful as the surface-active agents and preferably those which are substantially water soluble. An example of a particularly useful agent is Triton X–100 (an octylphenoxy polyethoxyethanol marketed by Rohm and Haas, Philadelphia, Pa.). Useful amounts of the surface-active agent depend on the surface area of the oil shale and can be easily determined by placing a representative sample of the shale in the aqueous liquid and adding the dilute aqueous solution of the surface-active agent with agitation until all of the shale settles to the bottom of the vessel. For many oil shales, useful amounts of the surface-active agent in the aqueous liquid, include from about 0.001% to about 1% or more by weight and more preferably from about 0.1% to about 0.5%, percents are based on oil shale.

The pH of the aqueous liquid should be sufficient to leach or solubilize the aluminous compound from the oil shale. This solubilization is accompanied by the evolution of carbon dioxide. Temperatures of the aqueous liquid can vary from about ambient to the boiling point temperature of the aqueous liquid. Preferably, the temperature is within the range of from about 50° C. to about 95° C. It is recognized that higher temperatures (including temperatures obtained in a pressurized system) may facilitate the operational characteristics of this process and are also useful.

Preferably, the oil shale is comminuted to obtain maximum surface area before it comes in contact with the aqueous liquid. Smaller surface areas are also useful, but the larger surface areas are preferred.

The oil shale should be contacted with the aqueous liquid for a sufficient time to permit thorough wetting of the oil shale and to permit the aqueous liquid to solubilize the aluminous compounds from the oil shale. Examples of such times include from about 1 minute or less to about 2 hours and longer, and preferably from about 5 to about 30 minutes. Higher acid concentrations, higher temperatures of the aqueous liquid and larger surface areas of the oil shale generally require a lower contact time; these variables, however, can be optimized for maximum process efficiency.

After the oil shale is contacted with the aqueous liquid, the aqueous liquid is separated from the oil shale. The oil shale extracted from the liquid can be further refined to obtain desirable components. Further processing of the aqueous liquid is desired to remove the aluminous compounds. Such aluminous compounds can be removed by various methods known in the art. Examples include adjusting the pH of the liquid to facilitate separating the aluminous compounds from other cations within the liquid. Another example is adding a large excess of sodium hydroxide to the liquid along with some carbon dioxide to precipitate iron hydroxide and alkaline earth carbonates, etc. from the solution—leaving aluminate in solution. Additional carbon dioxide added to the liquid precipitates a sodium aluminum hydroxy carbonate which is easily isolated and converted to alumina by heat. Nacholite, which is sometimes present with dawsonite, is also solubilized by the acid treatment and, thus, is a supplemental source of carbon dioxide for the aluminum precipitation step. Pure aluminum can be recovered from the alumina by the Hall process and other processes known in the art.

The following example is presented to specifically illustrate working embodiments of the invention. Initial aluminum content of the samples is determined by an X-ray diffraction analysis to determine percent dawsonite, the aluminum is then calculated based on the formula of dawsonite, i.e. $NaAl(OH)_2CO_3$. This aluminum content of the initial oil shale samples is checked by a wet chemical method effected on the shale after the kerogen has been removed by heating the shale at 500° C. for 18 hours. The analyses between the aluminum concentrations of the above methods vary from about 94% to about 99.2%. Unless otherwise specified, all percents are based on weight.

EXAMPLE 1

Three samples, each composed of the table indicated parts of oil shale comminuted to a −200 mesh size are agitated at 60° C. for 20 minutes in an aqueous mixture containing 5 parts of Triton X–100, 370 parts of HCl and 20,000 parts of water. Thereafter, the mixture is cooled for 30 minutes to ambient temperature and the spent shale is separated from the liquid by filtering. The resultant liquid is analyzed for aluminum by atomic absorption spectroscopy (calibration standards for the atomic absorption analysis are made from synthetic dawsonite which has been analyzed for aluminum by a wet chemical method). The results of the tests are indicated in the table:

TABLE I

| Sample | Parts of oil shale sample | Parts Al in sample | Parts Al recovered | Percent Al recovered |
|---|---|---|---|---|
| A | 1,102 | 24 | 23 | 96 |
| B | 1,144 | 24 | 19 | 79 |
| C | 1,129 | 33 | 27 | 82 |

What is claimed is:

1. A process of obtaining aluminous compounds from oil shale containing dawsonite comprising contacting the oil shale with an aqueous liquid containing a surface-active agent in amounts sufficient to permit wetting of the dawsonite with the aqueous liquid and an acid having a dissociation constant greater than about $1 \times 10^{-4}$ in amounts to substantially solubilize the aluminous compounds in the oil shale, separating the oil shale from the aqueous liquid and refining the aqueous liquid to obtain the aluminous compounds therefrom.

2. The process of claim 1 wherein the surface-active agent is present in the aqueous liquid in amounts from about 0.001 to about 1% by weight, based on the oil shale.

3. The process of claim 1 wherein the pH of the aqueous liquid is sufficient to release $CO_2$ from the dawsonite.

4. The process of claim 3 wherein the pH is less than about 3.

5. The process of claim 1 wherein the pH of the aqueous liquid, after separation from the oil shale, is adjusted to form water-soluble aluminate and to precipitate substantially all of the other metals within the aqueous liquid.

6. The process of claim 5 wherein the aqueous liquid containing the water-soluble aluminate is contacted with carbon dioxide to precipitate aluminum hydroxy carbonate which is then separated from the liquid.

References Cited

UNITED STATES PATENTS

| 1,971,354 | 8/1934 | Scheidt et al. | 23—143 |
| 3,389,975 | 6/1968 | Van Nordstrand | 23—52 X |
| 3,459,502 | 8/1969 | Van Nordstrand | 23—143 |

HERBERT T. CARTER, Primary Examiner

U.S. Cl. X.R.

23—52, 143